(12) United States Patent
Wang et al.

(10) Patent No.: US 7,605,967 B2
(45) Date of Patent: Oct. 20, 2009

(54) LIQUID CRYSTAL ELECTRO-OPTICAL MODULATOR AND METHOD OF OPTICAL MODULATION

(75) Inventors: Hsing-Lung Wang, Pingzhen (TW); Wei-Ting Hsu, Guantian Shiang (TW); Chu-Chun Yen, Xindian (TW); Chi-Lun Ting, Taipei (TW); Wei-Hsin Hou, Taipei (TW); Chi-Chang Liao, Tainan (TW); Shie-Chang Jeng, Ligang Shiang (TW)

(73) Assignee: Industrial Technology Research Institute, Hsinchu (TW)

( * ) Notice: Subject to any disclaimer, the term of this patent is extended or adjusted under 35 U.S.C. 154(b) by 102 days.

(21) Appl. No.: 11/462,079

(22) Filed: Aug. 3, 2006

(65) Prior Publication Data
US 2008/0030831 A1 Feb. 7, 2008

(51) Int. Cl.
*G02F 1/07* (2006.01)
*C09K 19/02* (2006.01)
(52) U.S. Cl. .................. 359/252; 349/182
(58) Field of Classification Search .......... 359/245, 359/247, 252, 253; 349/167, 176, 182
See application file for complete search history.

(56) References Cited

U.S. PATENT DOCUMENTS

| 4,435,047 | A | 3/1984 | Fergason | |
|---|---|---|---|---|
| 4,707,080 | A | 11/1987 | Fergason | |
| 6,333,770 | B1 * | 12/2001 | Omae et al. | 349/86 |
| 6,650,384 | B2 * | 11/2003 | Oguchi et al. | 349/86 |
| 6,950,156 | B1 * | 9/2005 | Yoshida | 349/106 |
| 7,098,976 | B2 * | 8/2006 | Minoura et al. | 349/113 |

FOREIGN PATENT DOCUMENTS

JP  06235908 A * 8/1994

OTHER PUBLICATIONS

Stephenson, et al., "Development of a Flexible Electronic Display Using Photographic Technology", *SID Digest*, vol. 16:3, pp. 774-777 (2004).
Stephenson, et al., "Technology and Applications for Low-Cost, High Volume Flexible Displays", *USDC Digest*, 24 pages (2005).
McCollough, et al., "Roll-to-Roll Manufacturing Considerations for Flexible, Cholesteric Liquid Crystal (ChLC) Display Media", *SID Digest*, vol. 6:1, pp. 64-67 (2005).
Chari, et al., "Single-substrate cholesteric liquid crystal displays by colloidal self-assembly", *Applied Physics Letters*, vol. 88, 3 pages (2006).
Chari, et al., "Drying-Assisted Self-Assembly Method for Flexible Cholesteric LCD — A Path to High-Performance Electronic Paper", *USDC Digest*, 24 pages (2006).
Rudhart, et al., "Phase switching of ordered arrays of liquid crystal emulsions", *Applied Physics Letters*, vol. 82, No. 16, pp. 2610-2612 (2003).
Kahn, et al., "Encapsulated Flexible Bistable Cholesteric Displays", *USDC Digest*, pp. 1-36 (2006).

* cited by examiner

*Primary Examiner*—William C Choi
(74) *Attorney, Agent, or Firm*—Alston & Bird LLP

(57) ABSTRACT

An electro-optical modulator includes a substrate, a first electrode over the substrate, a second electrode over the first electrode, the first electrode and second electrode being capable of providing an electric field between the first electrode and the second electrode, and a modulating structure between the first electrode and the second electrode, the modulating structure containing at least one liquid crystal cell capable of operating in one of a reflective mode and a transmissive mode under the control of the electrical field.

18 Claims, 19 Drawing Sheets

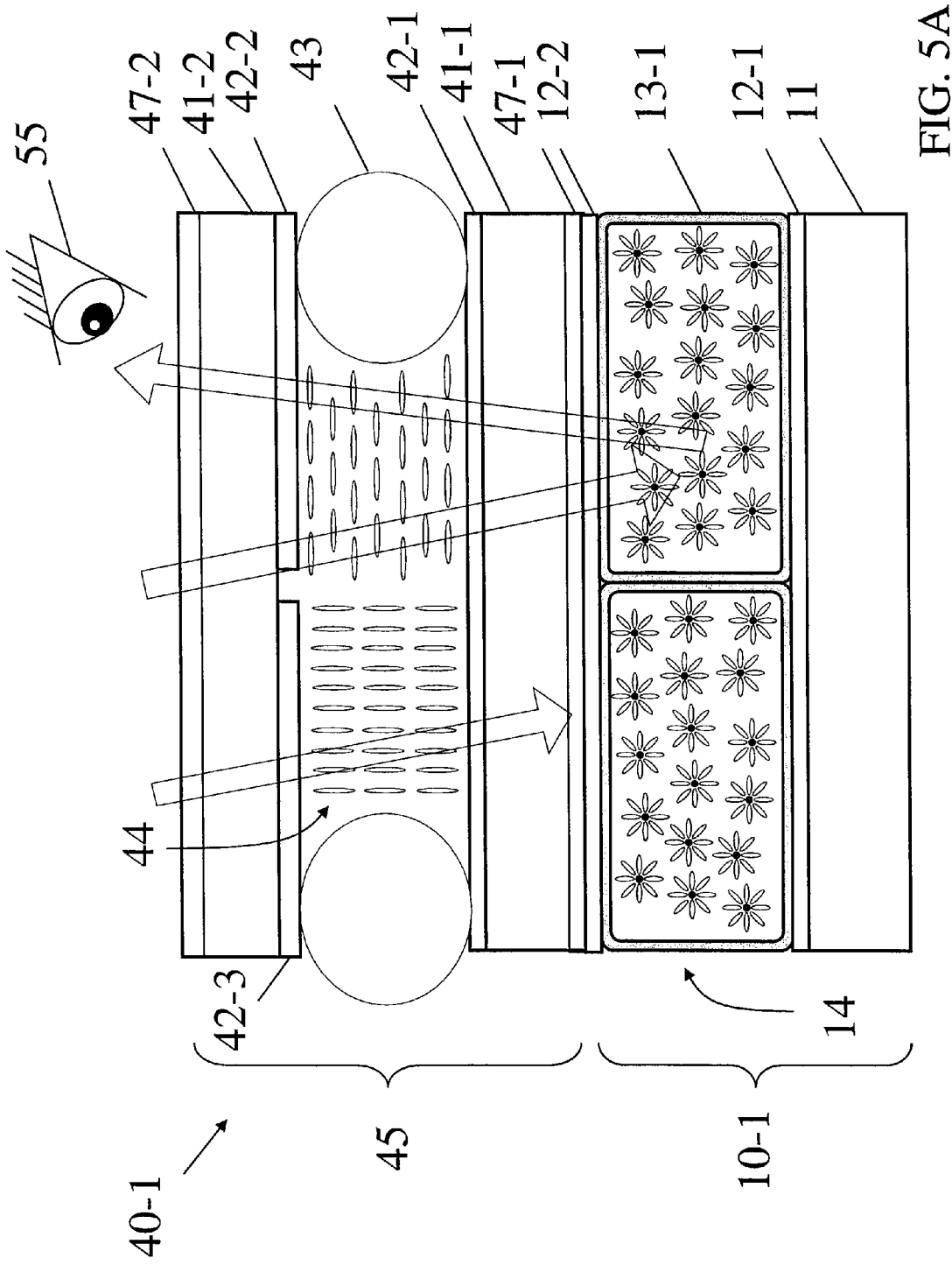

LIQUID CRYSTAL ELECTRO-OPTICAL MODULATOR AND METHOD OF OPTICAL MODULATION

BACKGROUND OF THE INVENTION

The present invention relates generally to a display device and more particularly, to a liquid crystal electro-optical modulator and a method of optical modulation.

As information technology continues to evolve, the demands for light modulation in commercial product applications such as c-signature, e-tag, e-booking and smart cards have been increasing in recent years. It is desirable to have an electro-optical modulator that is cost effective and satisfies the commercial product applications.

BRIEF SUMMARY OF THE INVENTION

Examples of the invention may provide an electro-optical modulator and a method of optical modulation.

Examples of the invention may provide an electro-optical modulator that comprises a substrate, a first electrode over the substrate, a second electrode over the first electrode, the first electrode and second electrode being capable of providing an electric field between the first electrode and the second electrode, and a modulating structure between the first electrode and the second electrode, the modulating structure containing at least one liquid crystal cell capable of operating in one of a reflective mode and a transmissive mode under the control of the electrical field.

Examples of the invention may also provide an electro-optical modulator that comprises a first pair of electrodes capable of applying a first electric field, a first liquid crystal cell between two electrodes of the first pair of electrodes and capable of operating in one of a reflective mode and a transmissive mode under the control of the first electrical field, a second pair of electrodes over the first liquid crystal cell, the second pair of electrodes capable of applying a second electric field, and a second liquid crystal cell between two electrodes of the second pair of electrodes and capable of being controlled by the second electrical field.

Some examples of the invention may also provide an electro-optical modulator that comprises a first pair of electrodes capable of applying a first electrical field, a first modulating structure between two electrodes of the first pair of electrodes, the first modulating structure including a first liquid crystal cell capable of operating in one of a reflective mode and a transmissive mode under the control of the first electrical field, a second pair of electrodes over the first liquid crystal cell, the second pair of electrodes capable of applying a second electrical field, and a second modulating structure between two electrodes the second pair of electrodes, the second modulating structure including a second liquid crystal cell capable of operating in one of an isotropic mode and an anisotropic mode under the control of the second electrical field.

Examples of the invention may also provide a method of optical modulation that comprises providing a modulator comprising a pair of electrodes, a modulating structure formed between the pair of electrodes, and a liquid crystal cell formed in the modulating structure capable of operating in one of a first mode and a second mode, operating the liquid crystal cell in the first mode, applying an electrical field between the pair of electrodes, and switching the liquid crystal cell from the first mode to the second mode.

Examples of the invention may also provide a method of optical modulation that comprises providing a modulator including a first pair of electrodes, a first liquid crystal cell formed between the first pair of electrodes capable of operating in one of a reflective mode and a transmissive mode, a second pair of electrodes formed over the first liquid crystal cell, and a second liquid crystal cell formed between the second pair of electrodes, operating the first liquid crystal cell in one of the reflective mode and the transmissive mode, and applying an electrical field between at least one of the first pair of electrodes or the second pair of electrodes.

Some examples of the invention may also provide a method of optical modulation that comprises providing a modulator including a first pair of electrodes, a first liquid crystal cell formed between the first pair of electrodes capable of operating in one of a reflective mode and a transmissive mode, a second pair of electrodes formed over the first liquid crystal cell, and a second liquid crystal cell formed between the second pair of electrodes capable of operating in one of an isotropic mode and an anisotropic mode, operating the first liquid crystal cell in one of the reflective mode and the transmissive mode, operating the second liquid crystal cell in one of the isotropic mode and the anisotropic mode, and applying an electrical field between at least one of the first pair of electrodes or the second pair of electrodes.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples consistent with the invention. It should be understood, however, that the invention is not limited to the precise arrangements and instrumentalities shown.

In the drawings:

FIG. 5A is a diagram illustrating a method for operating the electro-optical modulator illustrated in FIG. 4A;

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like portions.

Figure 1A:
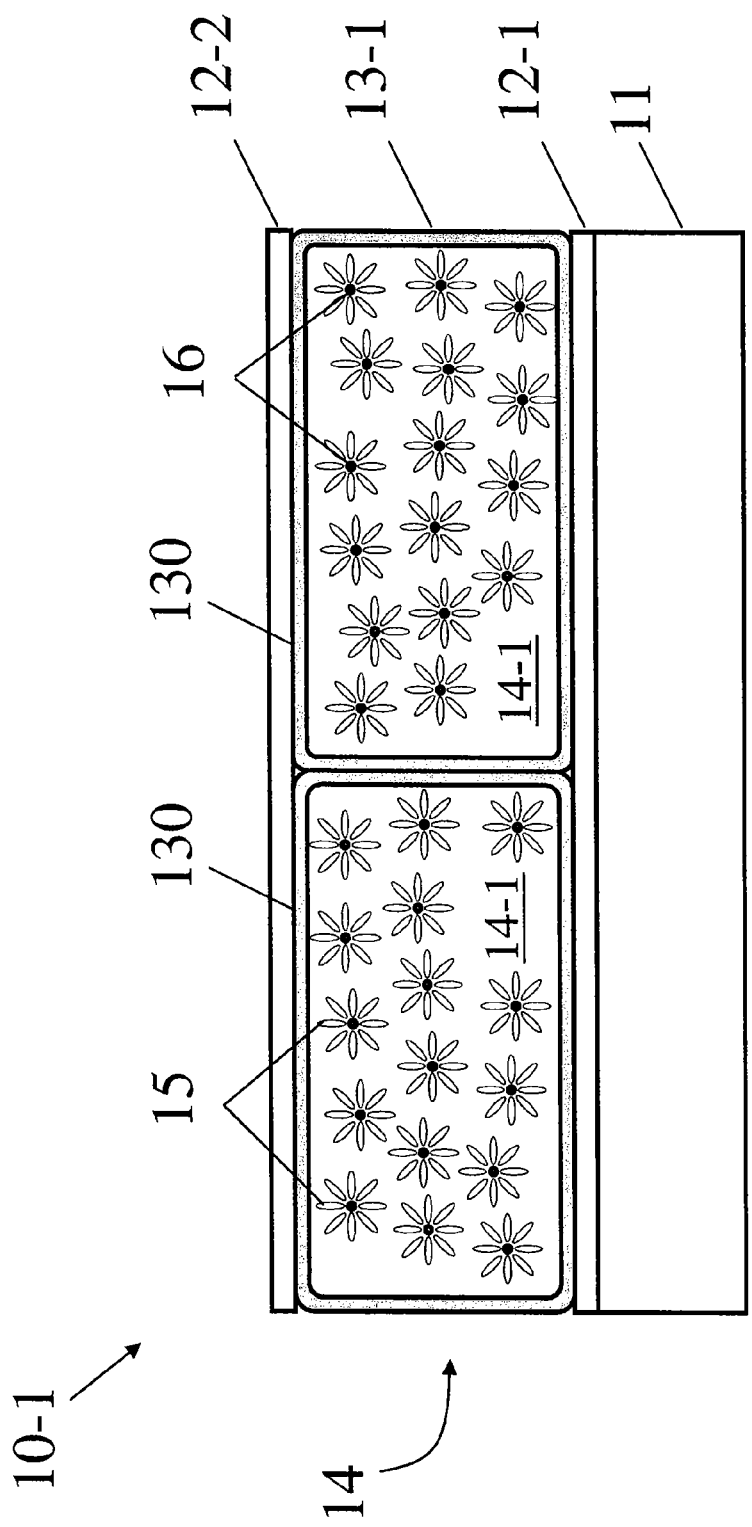
FIGS. 1A to 1D are cross-sectional diagrams of electro-optical modulators consistent with examples of the present invention.

FIGS. 1A to 1D are cross-sectional diagrams of electro-optical modulators 10-1 to 10-4 consistent with examples of the present invention. Referring to FIG. 1A, the electro-optical modulator 10-1 includes a substrate 11, a first conductive layer 12-1, a modulating structure 13-1, a liquid crystal cell 14 and a second conductive layer 12-2. The substrate 11 is optically transparent and may be made of polymer materials such as polyethylenterephthalate (PET), polycarbonate (PC) and polyethersulfone (PES). In one example, the thickness of the substrate 11 may be approximately 125 micrometers (μm), but this may vary for various applications. The first conductive layer 12-1, formed over the substrate 11, serves as a first electrode of the electro-optical modulator 10-1. The first conductive layer 12-1 may be a transparent conductive layer, such as a layer of indium tin oxide (ITO) or indium zinc oxide (IZO) having a thickness of approximately 0.1 to 0.2 μm, or a conducting polymer having a thickness of approximately 1 μm in some examples. The modulating structure 13-1 includes a plurality of modulating units 130 and is made of a polymer material such as fish gel and photograph gel. The height of the modulating structure 13-1 may range from approximately 5 to 15 μm in one example. The liquid crystal cell 14 includes a plurality of cell units 14-1, each of which may include a mixture of liquid crystal molecules 15 and fine particles 16. The weight percentage of the fine particles 16 in a cell unit 14-1 ranges from approximately 0.1% to 20%. Each of the plurality of cell units 14-1 corresponds to one of the plurality of modulating units 130. Specifically, each of the plurality of modulating units 130 functions to serves as a containment device that encapsulates or confines a corresponding one of the plurality of cell units 14-1. The second conductive layer 12-2, formed over the modulating structure 13-1, serves as a second electrode of the electro-optical modulator 10-1. The second conductive layer 12-2 includes a similar material to the first conductive layer 12-1, and has substantially the same thickness as the first conductive layer 12-1.

In the present example, the modulating structure 13-1 is formed by a conventional microencapsulating process, which encapsulates droplets of liquid crystal molecules and fine particles in polymer walls.

Figure 1B:
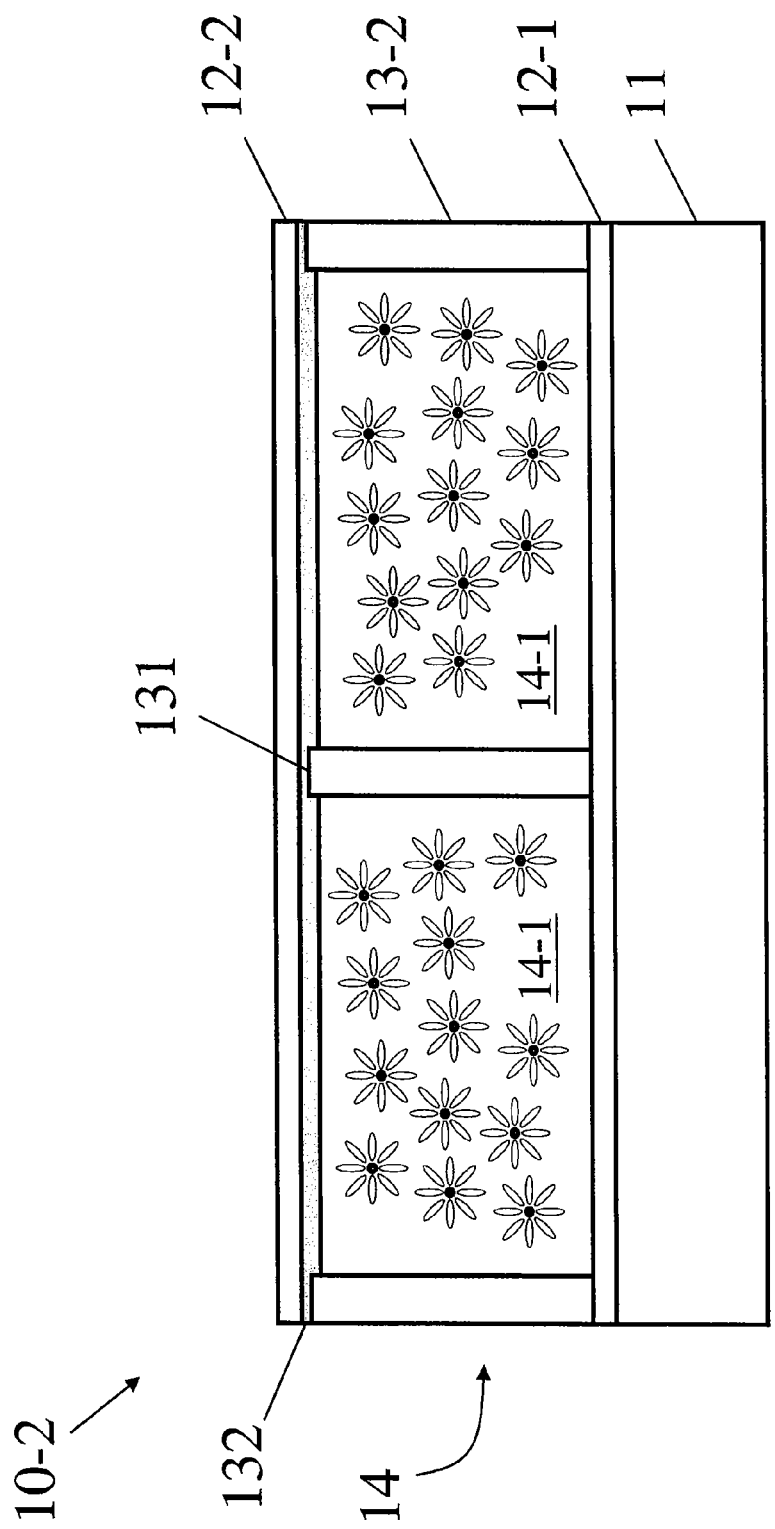

Referring to FIG. 1B, the electro-optical modulator 10-2 includes a similar structure to the electro-optical modulator 10-1 illustrated in FIG. 1A except a modulating structure 13-2. The modulating structure 13-2 includes a plurality of polymer banks 131 and a sealing layer 132 formed over the plurality of polymer banks 131. Each of the plurality of polymer banks 131 and the sealing layer 132 defines a modulating unit (not numbered) corresponding to one of the plurality of cell units 14-1. The modulating structure 13-2 may be formed by a conventional photolithography or molding process.

Figure 1C:
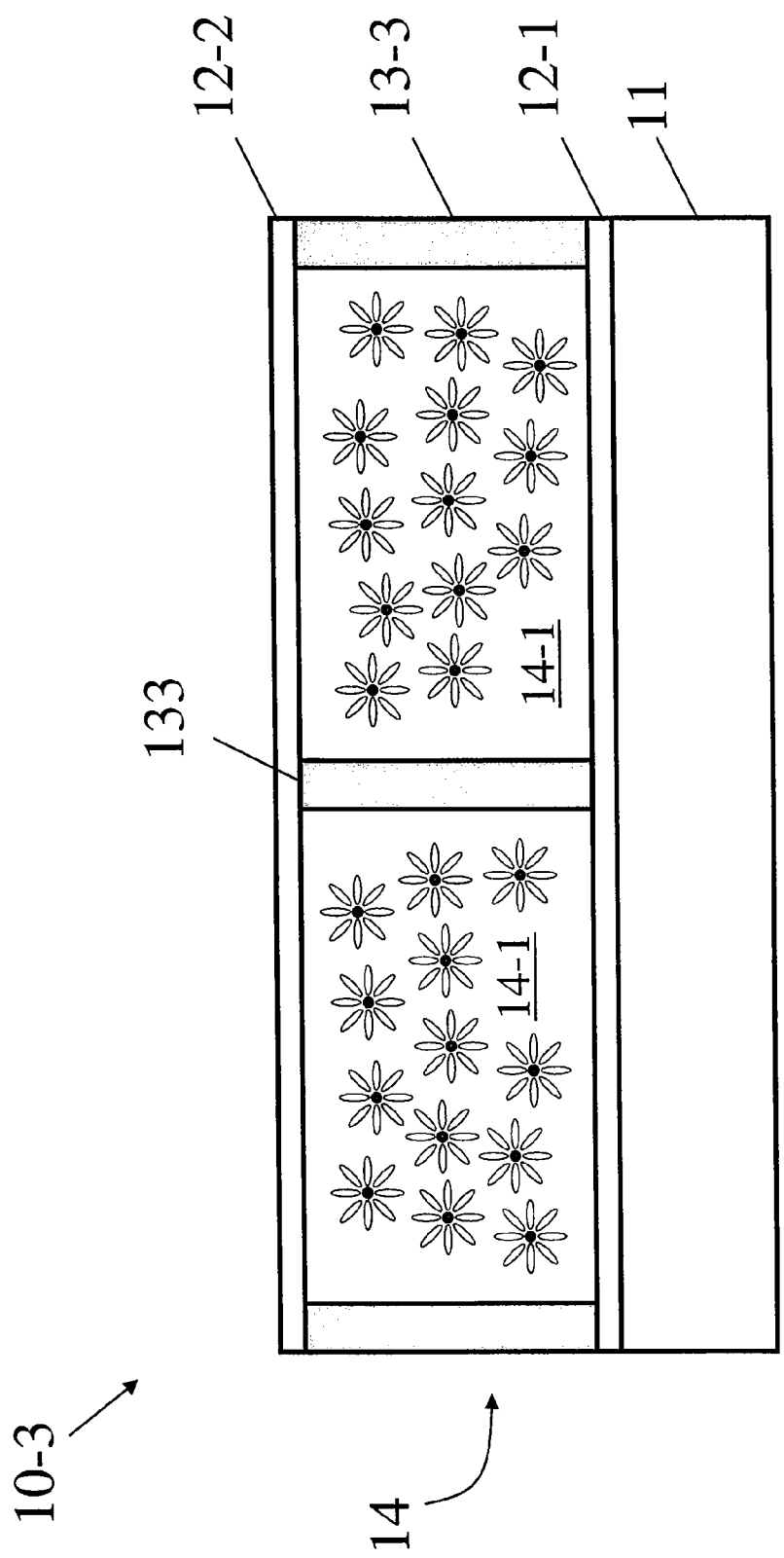

Referring to FIG. 1C, the electro-optical modulator 10-3 includes a similar structure to the electro-optical modulator 10-1 illustrated in FIG. 1A except a modulating structure 13-3. The modulating structure 13-3 includes a plurality of polymer walls 133. Each of the plurality of polymer walls 133 and the second conductive layer 12-2 defines a modulating unit (not numbered) corresponding to one of the plurality of cell units 14-1. The modulating structure 13-3 may be formed by a conventional photo-induced phase separation process.

Figure 1D:
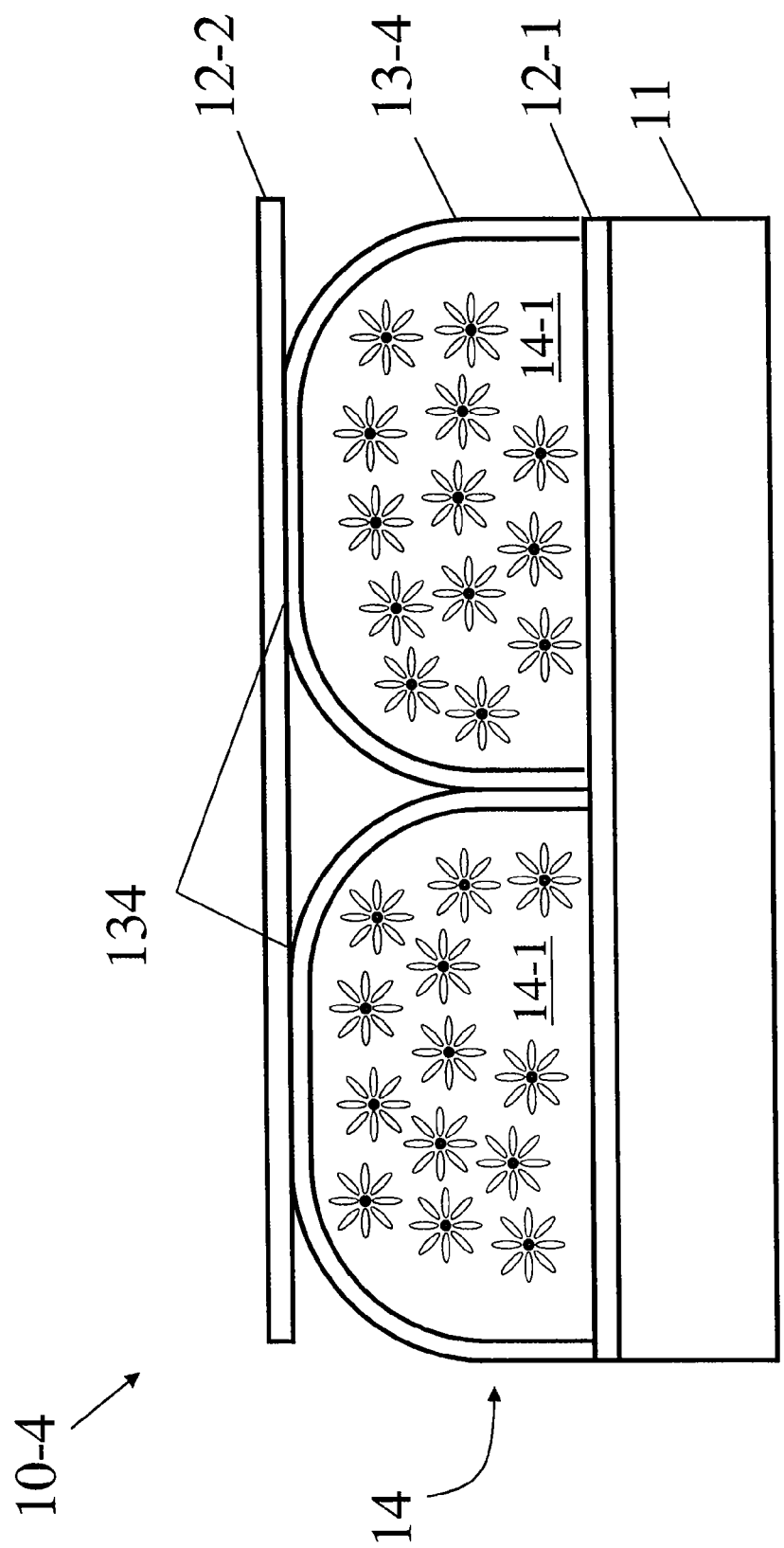

Referring to FIG. 1D, the electro-optical modulator 10-4 includes a similar structure to the electro-optical modulator 10-1 illustrated in FIG. 1A except a modulating structure 13-4. The modulating structure 13-4 includes a plurality of modulating units 134. Each of the plurality of modulating units 134 corresponds to one of the plurality of cell units 14-1. The modulating structure 13-4 may be formed by a conventional interfacial polymerization process.

Figure 2A:
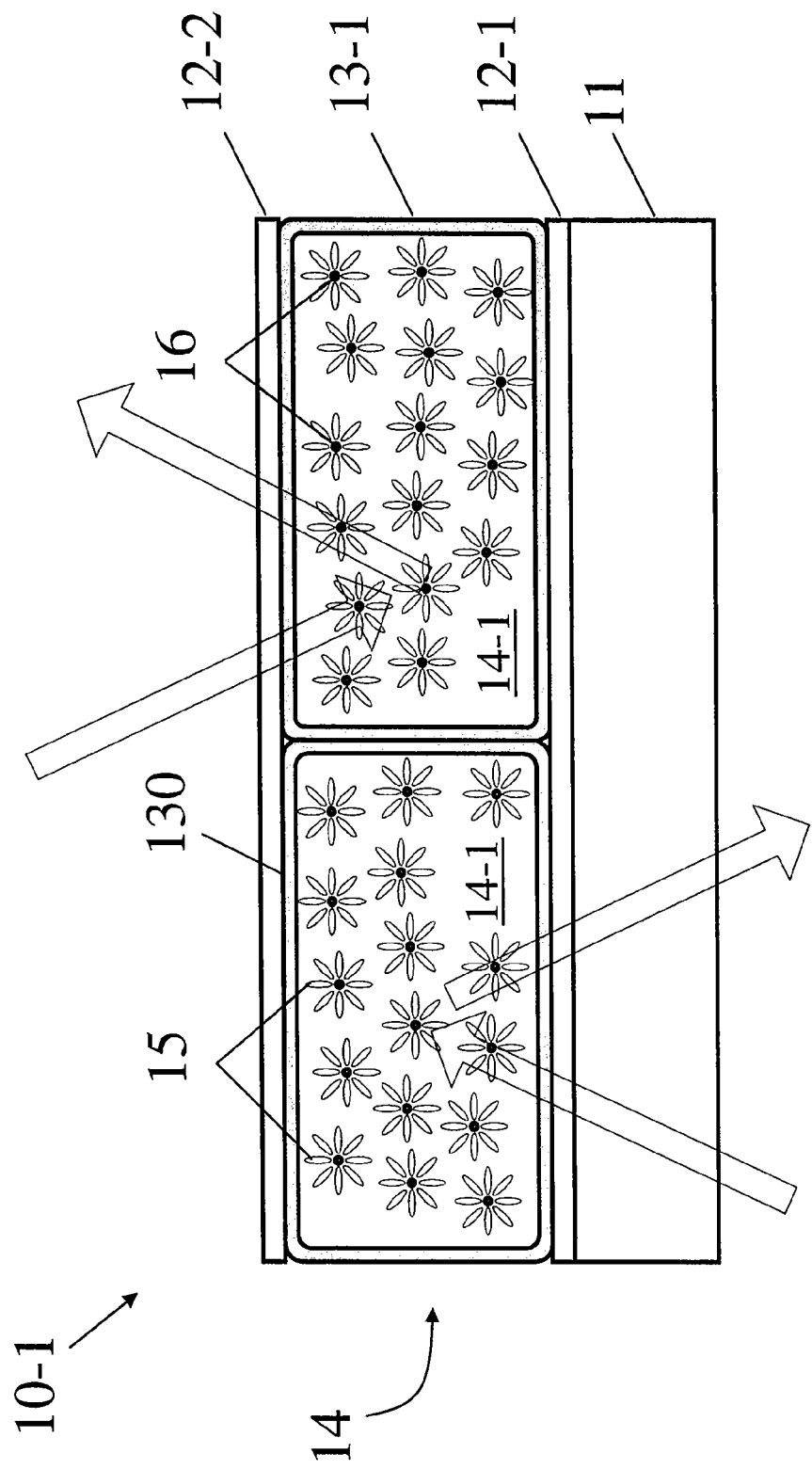
FIGS. 2A to 2C are diagrams each illustrating a method for operating an electro-optical modulator consistent with an example of the present invention.
Figure 2B:
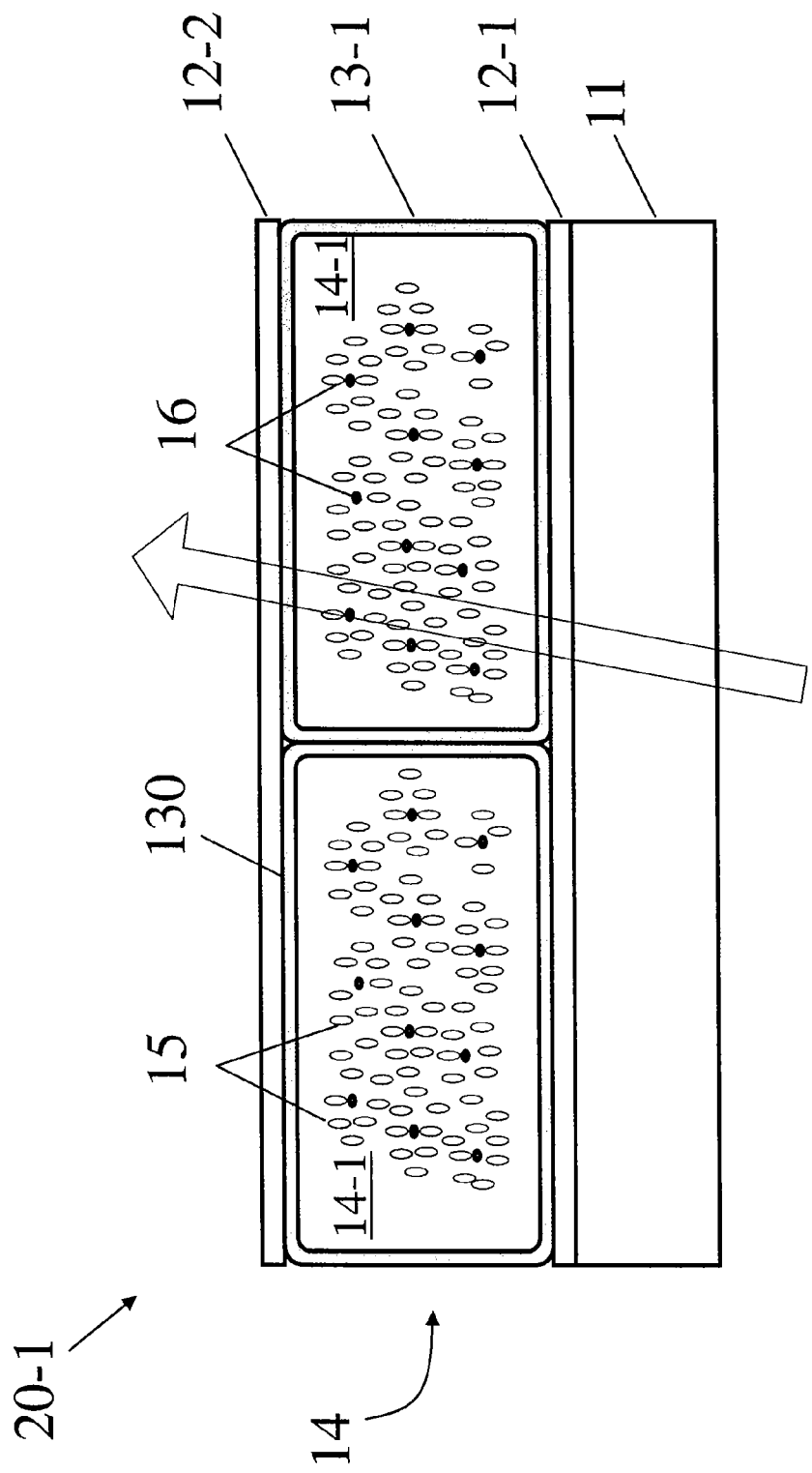
Figure 2C:
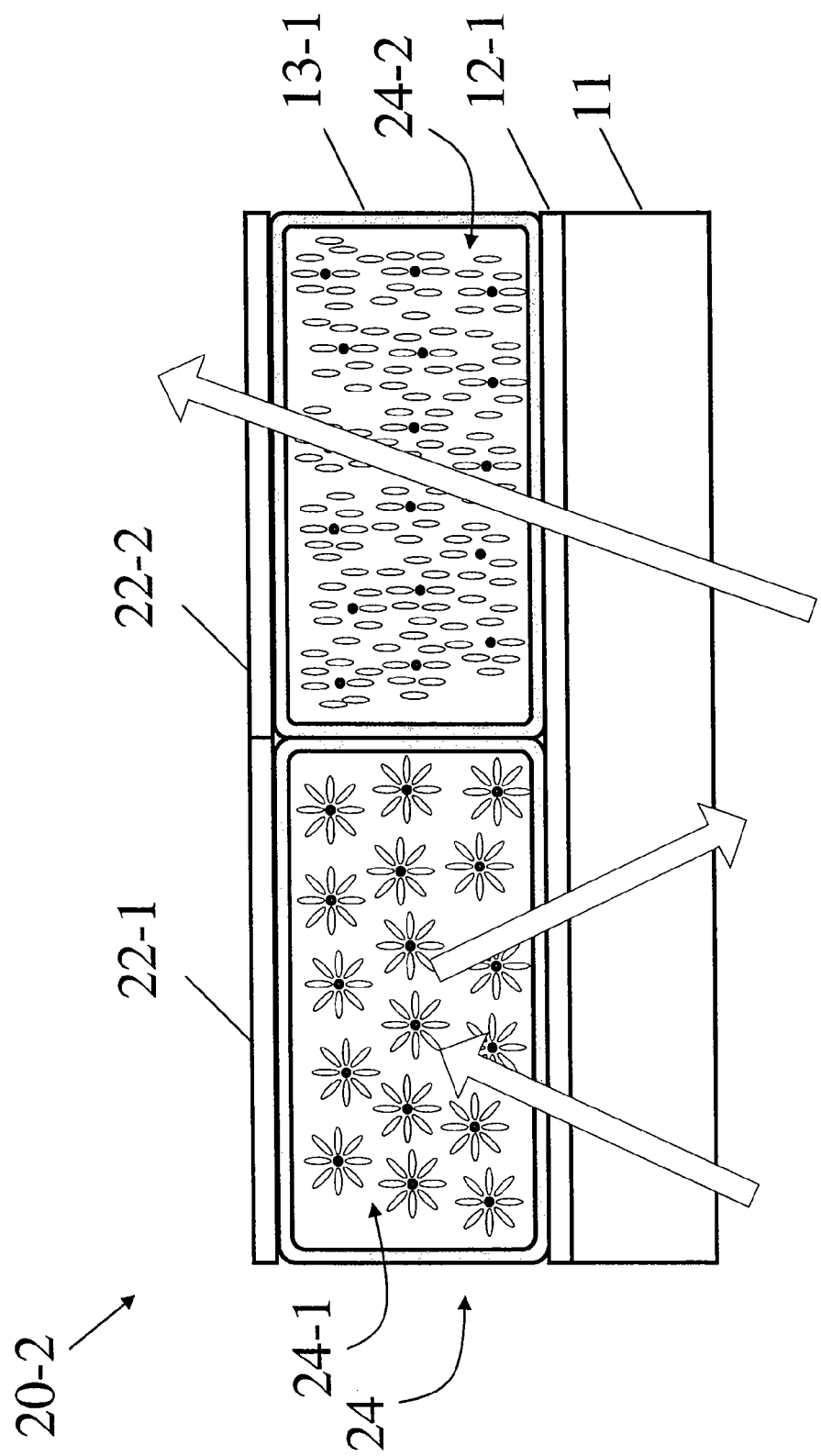

FIGS. 2A to 2C are diagrams each illustrating a method for operating an electro-optical modulator consistent with an example of the present invention. Referring to FIG. 2A, as an example of the electro-optical modulator 10-1 illustrated in FIG. 1A, the liquid crystal molecules 15 are oriented in a first pattern such that an incident light is reflected back. Specifically, an incident light at the substrate 11 from, for example, a backlight source is reflected by the liquid crystal cell 14. Similarly, an incident light at the second conductive layer 12-2 from, for example, an ambient light source is reflected by the liquid crystal cell 14. The electro-optical modulator 10-1 is said to operate in a reflective mode. The liquid crystal molecules 15 are not necessarily required to center around fine particles 16 as illustrated in FIGS. 1A and 2A. Other patterns that enable the liquid crystal cell 14 to reflect an incident light are also possible.

Referring to FIG. 2B, an electro-optical modulator 20-1 includes a similar structure to the electro-optical modulator 10-1 illustrated in FIG. 2A except that the liquid crystal molecules 15 are oriented in a second pattern, which allows an incident light to pass the liquid crystal cell 14. The electro-optical modulator 20-1 is said to operate in a transmissive mode. In operation, by applying a suitable electrical field between the first conductive layer 12-1 and the second conductive layer 12-2, a reflective-mode modulator such as the modulator 10-1 illustrated in FIG. 2A is able to be switched to a transmissive-mode modulator such as the modulator 20-1 illustrated in FIG. 2B, and vice versa. The electro-optical modulators 10-1 and 20-1 respectively illustrated in FIGS. 1A and 2B therefore exhibit bistable properties, which means that an electro-optical modulator may operate in either a first or a second stable state when an external source such as an electrical field is removed. In the present example, the first state refers to the reflective mode and the second state refers to the transmissive mode, and vice versa. In one example consistent with the present invention, the electrical field ranges from several volts per micrometer to several tens of volts per micrometer. The electrical field may be built by applying voltage signals of different amplitudes or applying voltage signals at different frequencies to the first conductive layer 12-1 and the second conductive layer 12-2.

Referring to FIG. 2C, an electro-optical modulator 20-2 includes a similar structure to the electro-optical modulator 10-1 illustrated in FIG. 2A except a liquid crystal cell 24, a second conductive layer 22-1 and a third conductive layer 22-2 separated from the second conductive layer 22-1. The liquid crystal cell 24 includes reflective-mode cell units 24-1 and transmissive-mode cell units 24-2. In operation, each of the reflective-mode cell units 24-1 is able to be switched to the transmissive mode by applying a first electrical field between the first conductive layer 12-1 and the second conductive layer 22-1. Similarly, each of the transmissive-mode cell units 24-2 is able to be switched to the reflective mode by applying a second electrical field between the first conductive layer 12-1 and the third conductive layer 22-2. Skilled persons in the art will understand that the first conductive layer 12-1 extends in a first direction, while the second conductive layer 22-1 and the third conductive layer 22-2 extend in a second direction substantially orthogonal to the first direction. Furthermore, skilled persons in the art will understand that one of the modulating structures 13-2, 13-3 and 13-4 respectively illustrated in FIGS. 1B, 1C and 1D may also be used in the electro-optical modulators 20-1 and 20-2 as well as the modulating structure 13-1.

Figure 3A:
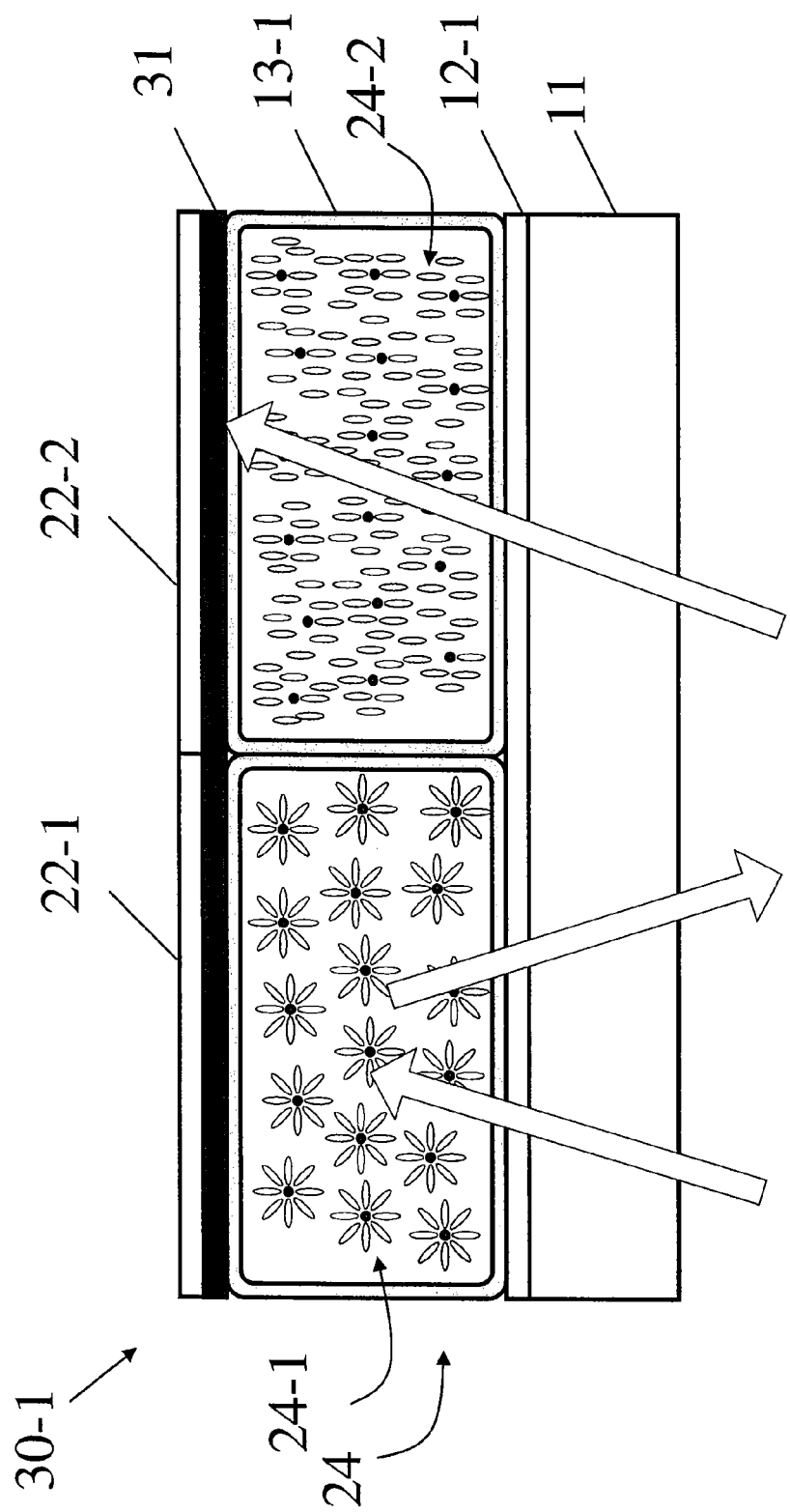
FIG. 3A is a cross-sectional diagram of an electro-optical modulator consistent with another example of the present invention.

FIG. 3A is a cross-sectional diagram of an electro-optical modulator 30-1 consistent with another example of the present invention. Referring to FIG. 3A, the electro-optical modulator 30-1 includes a similar structure to the electro-optical modulator 20-2 illustrated in FIG. 2C except a light absorbing layer 31. The light absorbing layer 31, disposed between the liquid crystal cell 24 and the second conductive layer 22-1 and the third conductive layer 22-2, is capable of absorbing light transmitting through the liquid crystal cell 24 and in particular, the cell units 24-2. In another example, the light absorbing layer 31 is disposed over the second conductive layer 22-1 and the third conductive layer 22-2 so that the conductive layers 22-1 and 22-2 are sandwiched between the liquid crystal cell 24 and the light absorbing layer 31.

Figure 3B:
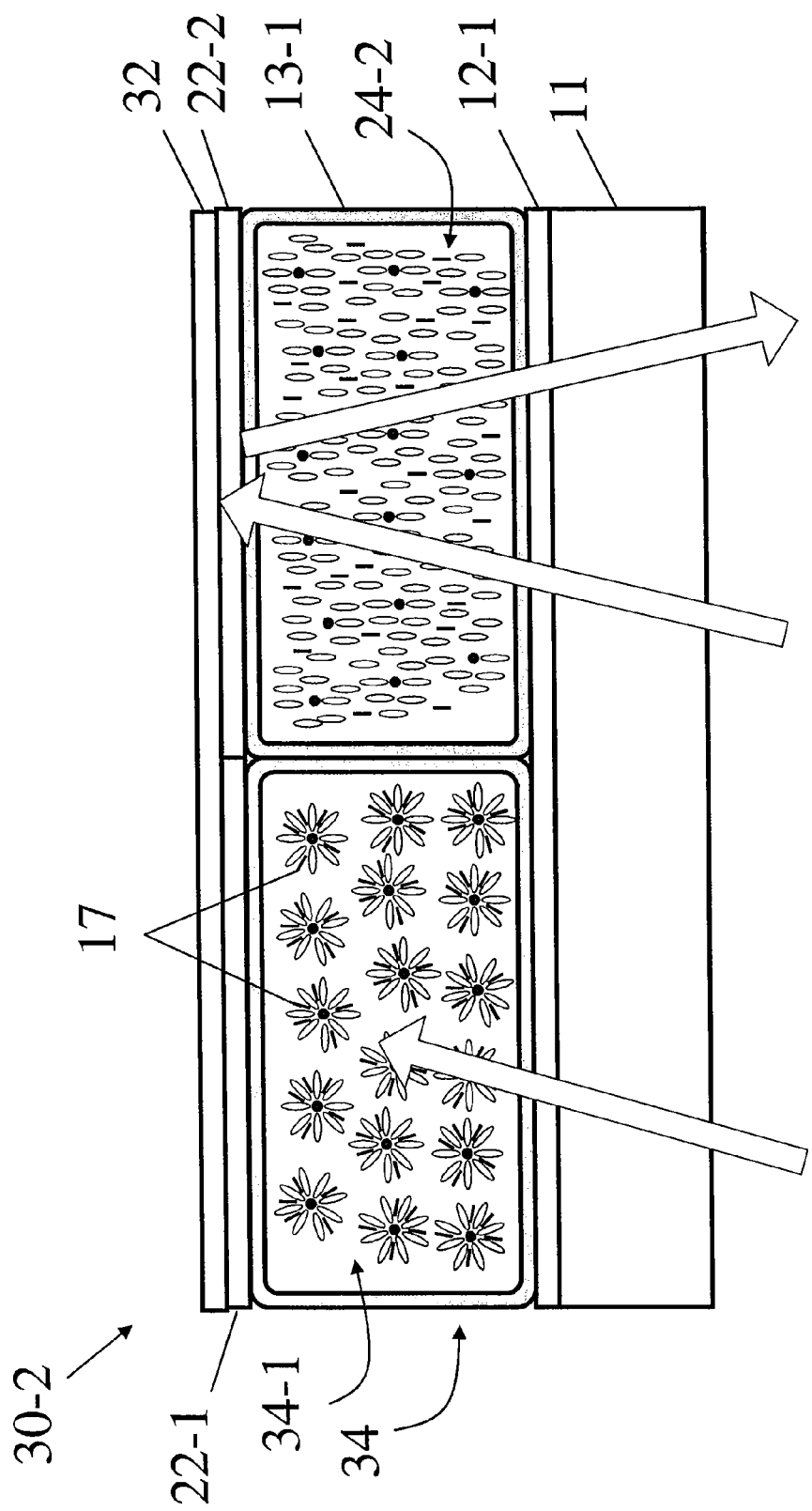
FIG. 3B is a cross-sectional diagram of an electro-optical modulator consistent with still another example of the present invention.

FIG. 3B is a cross-sectional diagram of an electro-optical modulator 30-2 consistent with still another example of the present invention. Referring to FIG. 3B, the electro-optical modulator 30-2 includes a similar structure to the electro-optical modulator 20-2 illustrated in FIG. 2C except a liquid crystal cell 34. The liquid crystal cell 34 includes a plurality of dichroic dyes 17 in cell units 34-1. The cell units 34-1 are capable of absorbing light transmitting through the liquid crystal cell 34, which otherwise would operate in the reflective mode in the absence of the dichroic dyes 17.

The electro-optical modulator 30-2 further includes a reflector 32 disposed over the first conductive layer 22-1 and the second conductive layer 22-2. The reflector 32 is capable of reflecting light transmitting through the liquid crystal cell 34 and in particular, the cell units 24-2. In another example, the reflector 32 is disposed between the conductive layers 22-1, 22-2. and the liquid crystal cell 34.

Figure 4A:
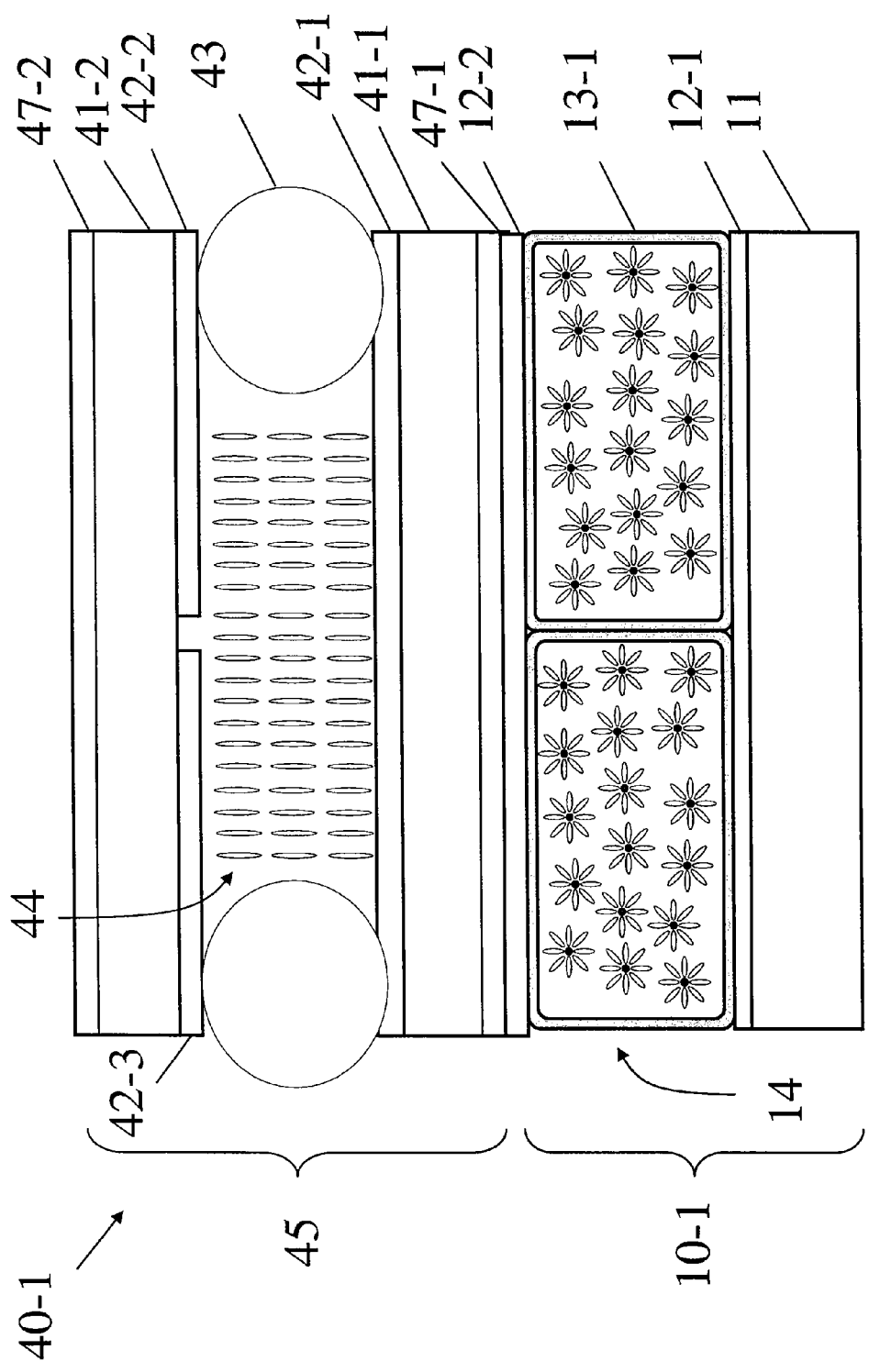
FIG. 4A is a cross-sectional diagram of an electro-optical modulator consistent with an example of the present invention.

FIG. 4A is a cross-sectional diagram of an electro-optical modulator 40-1 consistent with an example of the present invention. Referring to FIG. 4A, the electro-optical modulator 40-1 includes a first modulator similar to the electro-optical modulator 10-1 illustrated in FIG. 1A and a second modulator 45. The first modulator 10-1 includes the first substrate 11, the first electrode 12-1, the modulating structure 13-1, the first liquid crystal cell 14 and the second electrode 12-2. The second modulator 45, which functions to serve as a panel of the electro-optical modulator 40-1, may be laminated to the first modulator 10-1. The second modulator 45 includes a second substrate 41-1, a first polarizer 47-1, a third electrode 42-1, spacers 43, a fourth electrode 42-2, a fifth electrode 42-3, a second liquid crystal cell 44, a second polarizer 47-2 and a third substrate 41-2.

Figure 4B:
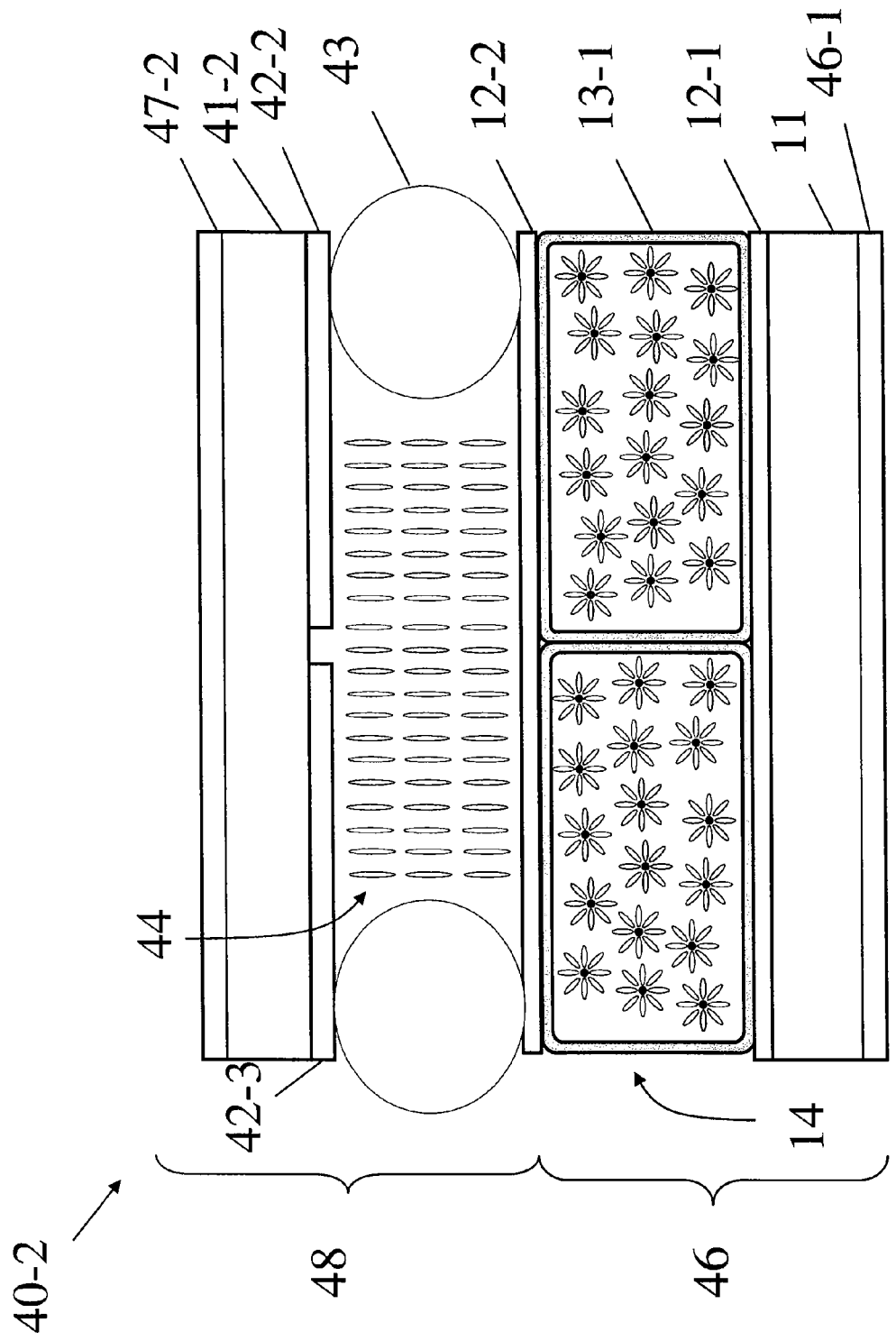
FIG. 4B is a cross-sectional diagram of an electro-optical modulator consistent with another example of the present invention.

FIG. 4B is a cross-sectional diagram of an electro-optical modulator 40-2 consistent with another example of the present invention. Referring to FIG. 4B, the electro-optical modulator 40-2 includes a first modulator 46 and a second modulator 48. The first modulator 46 is similar to the electro-optical modulator 10-1 illustrated in FIG. 1A except a first polarizer 46-1, which is disposed to sandwich the first substrate 11 with the first electrode 12-1. The second modulator 48 includes the second electrode 12-2, the spacers 43, the fourth electrode 42-2, the fifth electrode 42-3, the second liquid crystal cell 44, the second polarizer 47-2 and the third substrate 41-2.

FIG. 5A is a diagram illustrating a method for operating the electro-optical modulator 40-1 illustrated in FIG. 4A. Referring to FIG. 5A, assuming that the second liquid crystal cell 44 is a vertically arranged (VA) mode panel and no electrical field is applied between the third electrode 42-1 and the fifth electrode 42-3, an incident light at the third substrate 41-2 transmitting through the second polarizer 47-2 and the second liquid crystal cell 44 is blocked by the first polarizer 47-1. As a comparison, if an electrical field is applied between the third electrode 42-1 and the fourth electrode 42-2, changing the orientation of the liquid crystal molecules in the second liquid crystal cell 44, an incident light at the third substrate 41-2 transmitting through the second liquid crystal cell 44 is reflected by the first liquid crystal cell 14 operating in the reflective mode. The reflected light transmits through the second liquid crystal cell 44 to a viewer 55 at the third substrate 41-2.

Figure 5B:
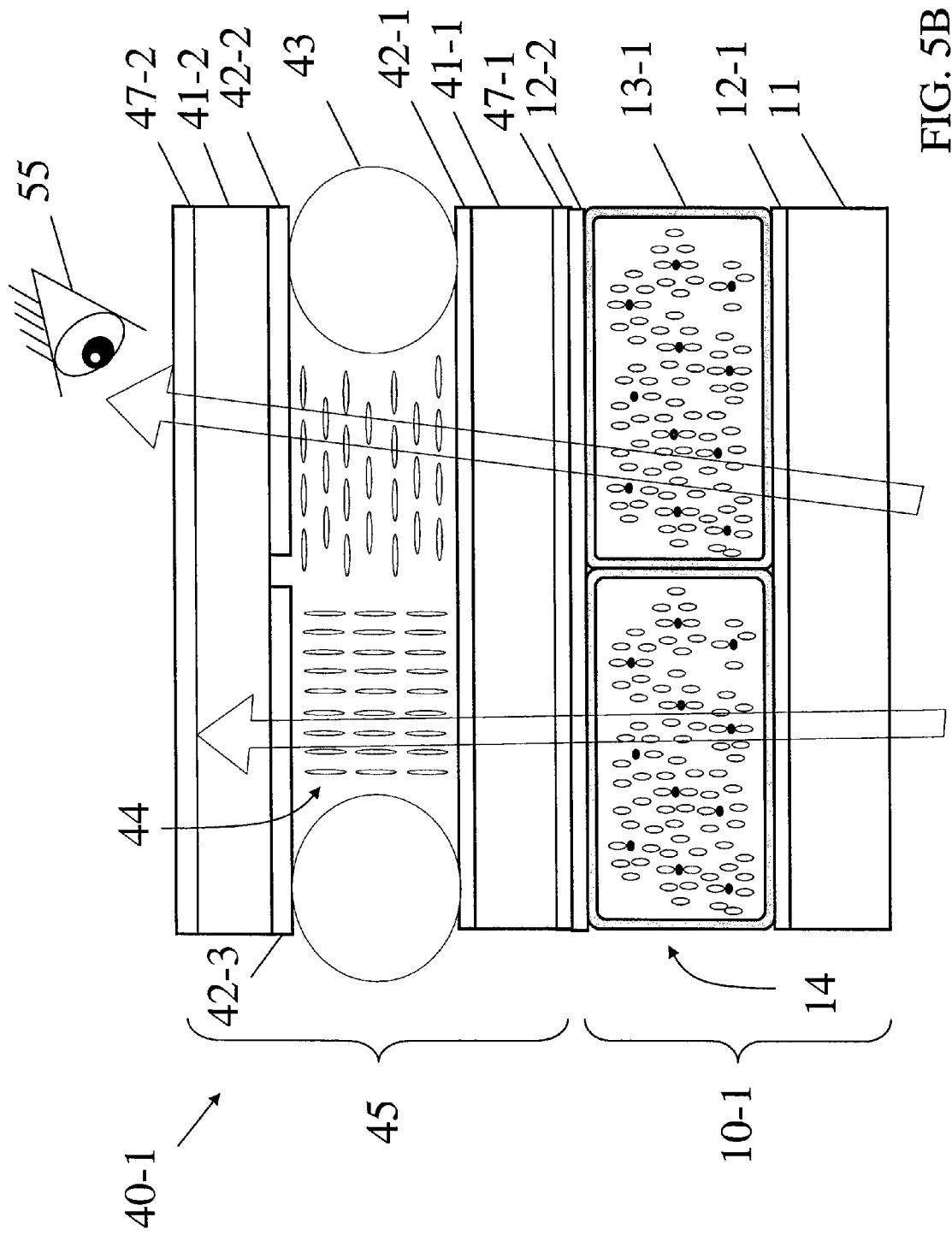
FIG. 5B is a diagram illustrating another method for operating the electro-optical modulator illustrated in FIG. 4A.

FIG. 5B is a diagram illustrating another method for operating the electro-optical modulator 40-1 illustrated in FIG. 4A. Referring to FIG. 5B, a first electrical field is applied between the first electrode 12-1 and the second electrode 12-2 to switch the first modulator 10-1 to the transmissive mode. If no electrical field is applied between the third electrode 42-1 and the fifth electrode 42-3, an incident light at the first substrate 11 transmitting through the first liquid crystal cell 14, the first polarizer 47-1 and the second liquid crystal cell 44 is blocked by the second polarizer 47-2. As a comparison, if a second electrical field is applied between the third electrode 42-1 and the fourth electrode 42-2, changing the orientation of the liquid crystal molecules in the second liquid crystal cell 44, an incident light at the first substrate 11 transmitting through the first liquid cell 14 and the second liquid crystal cell 44 to the viewer 55 at the third substrate 41-2.

Figure 5C:
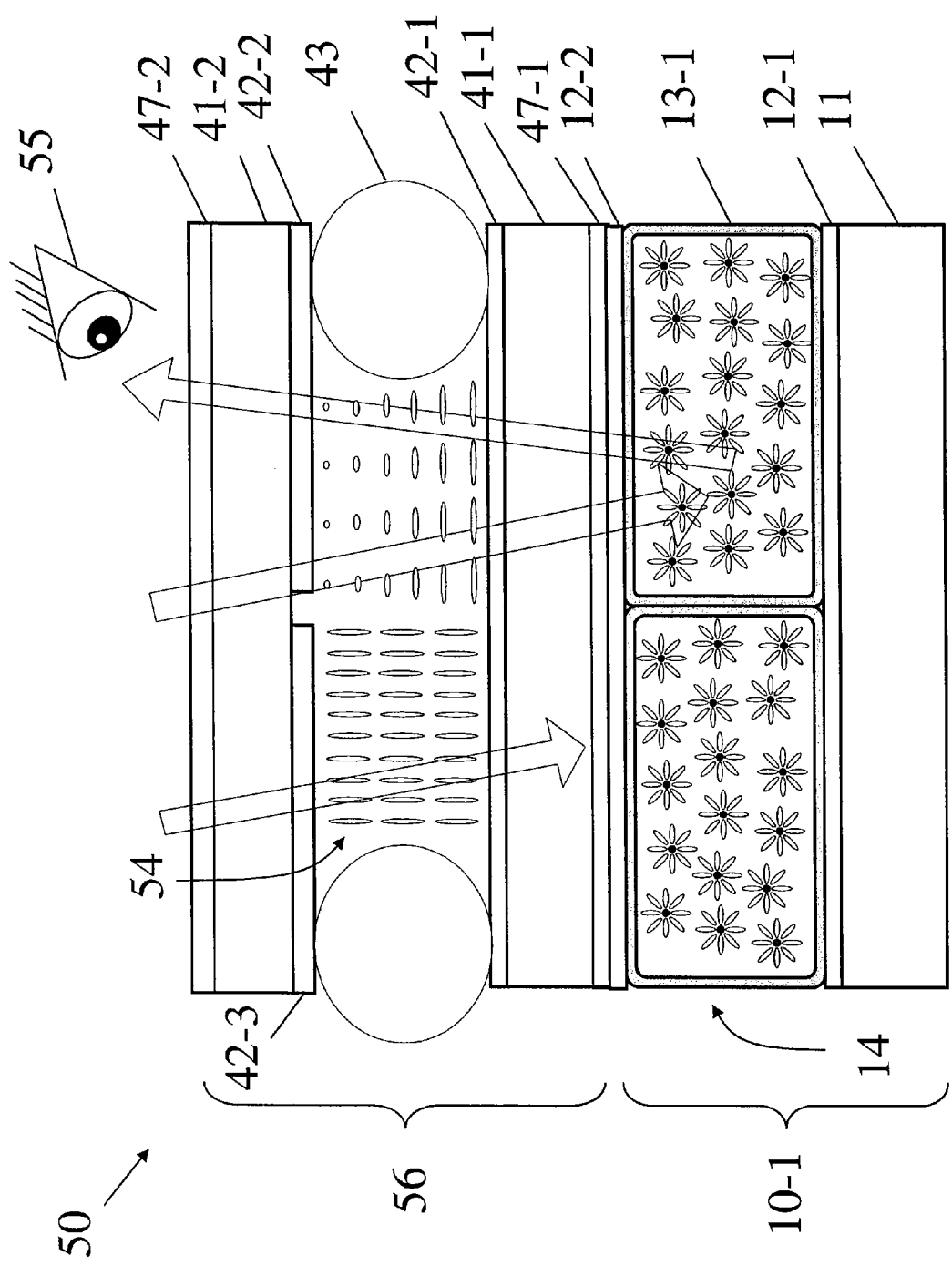
FIG. 5C is a diagram illustrating a method for operating an electro-optical modulator consistent with an example of the present invention.

FIG. 5C is a diagram illustrating a method for operating an electro-optical modulator 50 consistent with an example of the present invention. Referring to FIG. 5C, the electro-optical modulator 50 includes a similar structure to the electro-optical modulator 40-1 illustrated in FIG. 5A except a second modulator 56, which is a twisted nematic (TN) mode panel. In operation, if no electrical field is applied between the third electrode 42-1 and the fifth electrode 42-3, an incident light at the third substrate 41-2 transmitting through the second polarizer 47-2 and a second liquid crystal cell 54 is blocked by the first polarizer 47-1. As a comparison, if an electrical field is applied between the third electrode 42-1 and the fourth electrode 42-2, changing the orientation of the liquid crystal molecules in the second liquid crystal cell 54, an incident light at the third substrate 41-2 transmitting through the second liquid crystal cell 54 is reflected by the first liquid crystal cell 14 operating in the reflective mode. The reflected light transmits through the second liquid crystal cell 54 to a viewer 55 at the third substrate 41-2.

Figure 5D:
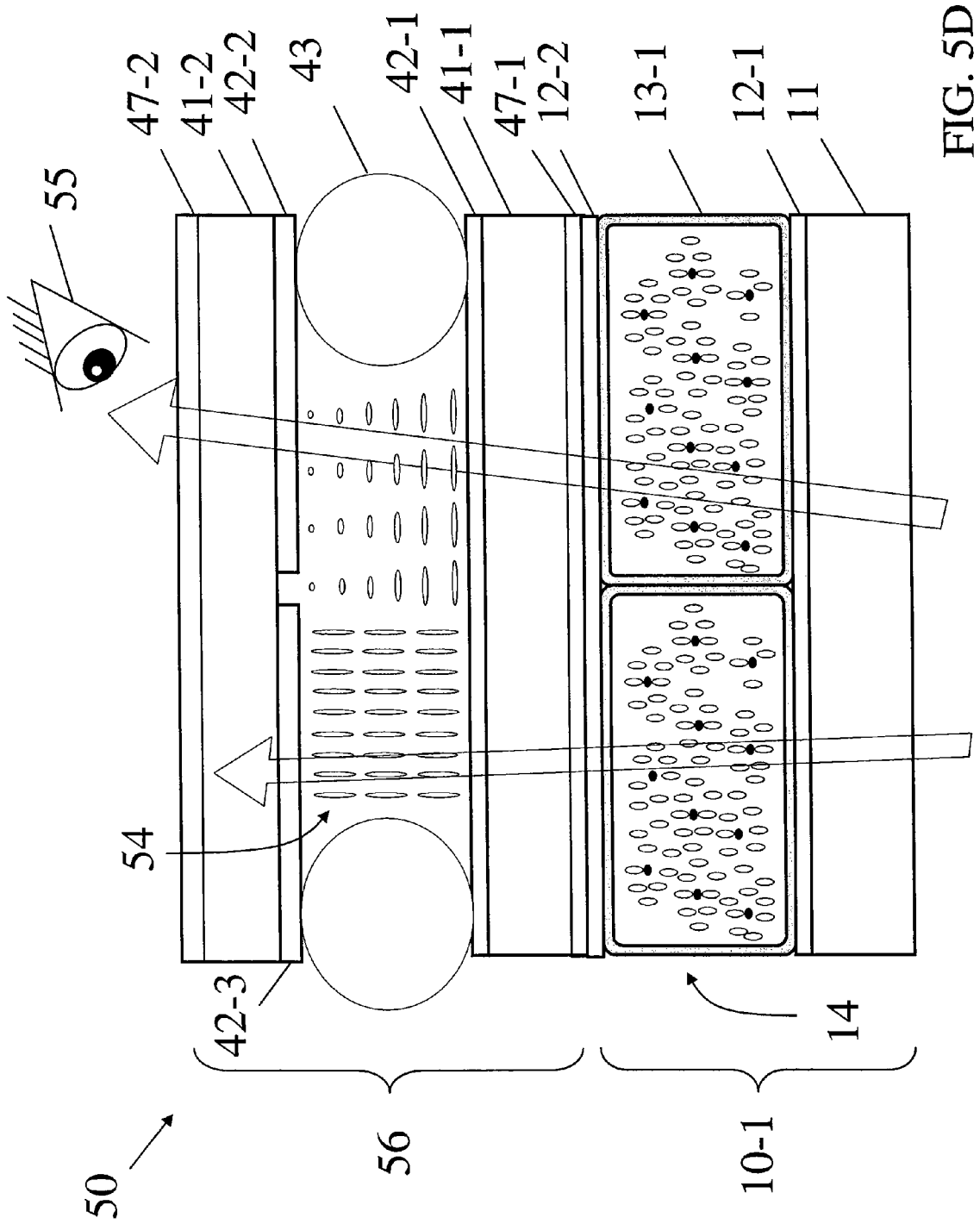
FIG. 5D is a diagram illustrating another method for operating the electro-optical modulator illustrated in FIG. 5C.

FIG. 5D is a diagram illustrating another method for operating the electro-optical modulator 50 illustrated in FIG. 5C. Referring to FIG. 5D, a first electrical field is applied between the first electrode 12-1 and the second electrode 12-2 to switch the first modulator 10-1 to the transmissive mode. If no electrical field is applied between the third electrode 42-1 and the fifth electrode 42-3, an incident light at the first substrate 11 transmitting through the first liquid crystal cell 14, the first polarizer 47-1 and the second liquid crystal cell 54 is blocked by the second polarizer 47-2. As a comparison, if a second electrical field is applied between the third electrode 42-1 and the fourth electrode 42-2, changing the orientation of the liquid crystal molecules in the second liquid crystal cell 54, an incident light at the first substrate 11 transmitting through the first liquid cell 14 and the second liquid crystal cell 54 to the viewer 55 at the third substrate 41-2.

Figure 6A:
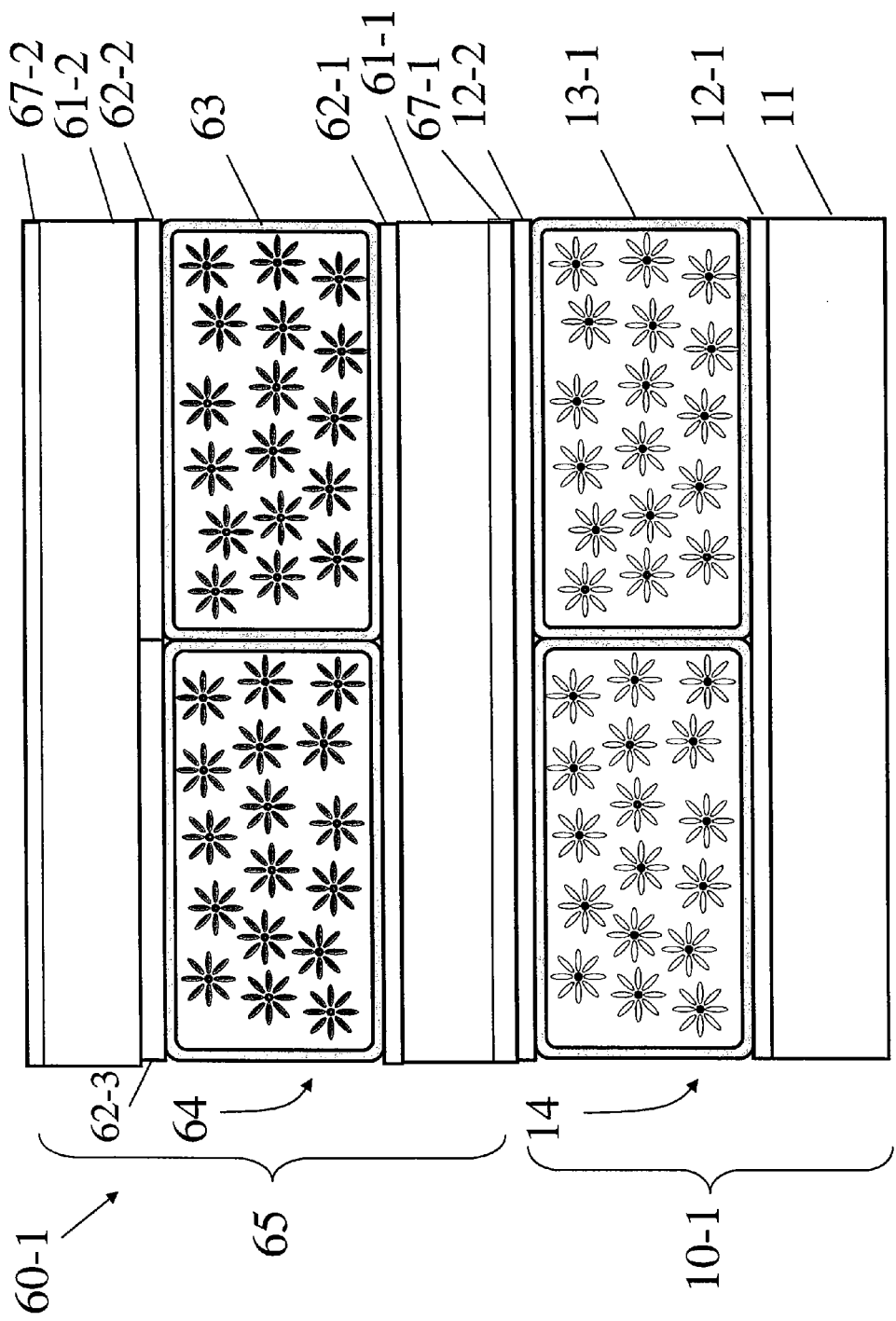
FIG. 6A is a cross-sectional diagram of an electro-optical modulator consistent with an example of the present invention.

FIG. 6A is a cross-sectional diagram of an electro-optical modulator 60-1 consistent with an example of the present invention. Referring to FIG. 6A, the electro-optical modulator 60-1 includes a first modulator similar to the electro-optical modulator 10-1 illustrated in FIG. 1A and a second modulator 65. The first modulator 10-1 includes the first substrate 11, the first electrode 12-1, the first modulating structure 13-1, the first liquid crystal cell 14 and the second electrode 12-2. The second modulator 65, which functions to serve as a panel of the electro-optical modulator 60-1, may be laminated to the first modulator 10-1. The second modulator 65 includes a second substrate 61-1, a first polarizer 67-1, a third electrode 62-1, a second modulating structure 63, a fourth electrode 62-2, a fifth electrode 62-3, a second liquid crystal cell 64, a second polarizer 67-2 and a third substrate 61-2.

The first liquid crystal cell 14 is operable in a reflective mode or a transmissive mode. In one aspect, the first liquid crystal cell 14 includes inorganic fine particles such as silica particles and positive liquid crystal molecules. In another aspect, the first liquid crystal cell 14 includes organic fine particles such as polystyrene or divinylbenzene (DVB) or copolymer particles and positive liquid crystal molecules. The second liquid crystal cell 64 exhibits an isotropic optical feature (hereinafter "isotropic mode") in the absence of an electrical field, or exhibits an anisotropic optical feature (hereinafter "anisotropic mode") in the presence of an electrical field. In the isotropic mode, the optical property of liquid crystal molecules is independent of direction. In contrast, in the anisotropic mode, the optical property of liquid crystal molecules is dependent of direction. In one aspect, the second liquid crystal cell 64 includes carbon nanotube (CNT) particles and negative liquid crystal molecules. In another aspect, the second liquid crystal cell 64 includes carbon 60 Fullerene particles and negative liquid crystal molecules.

Figure 6B:
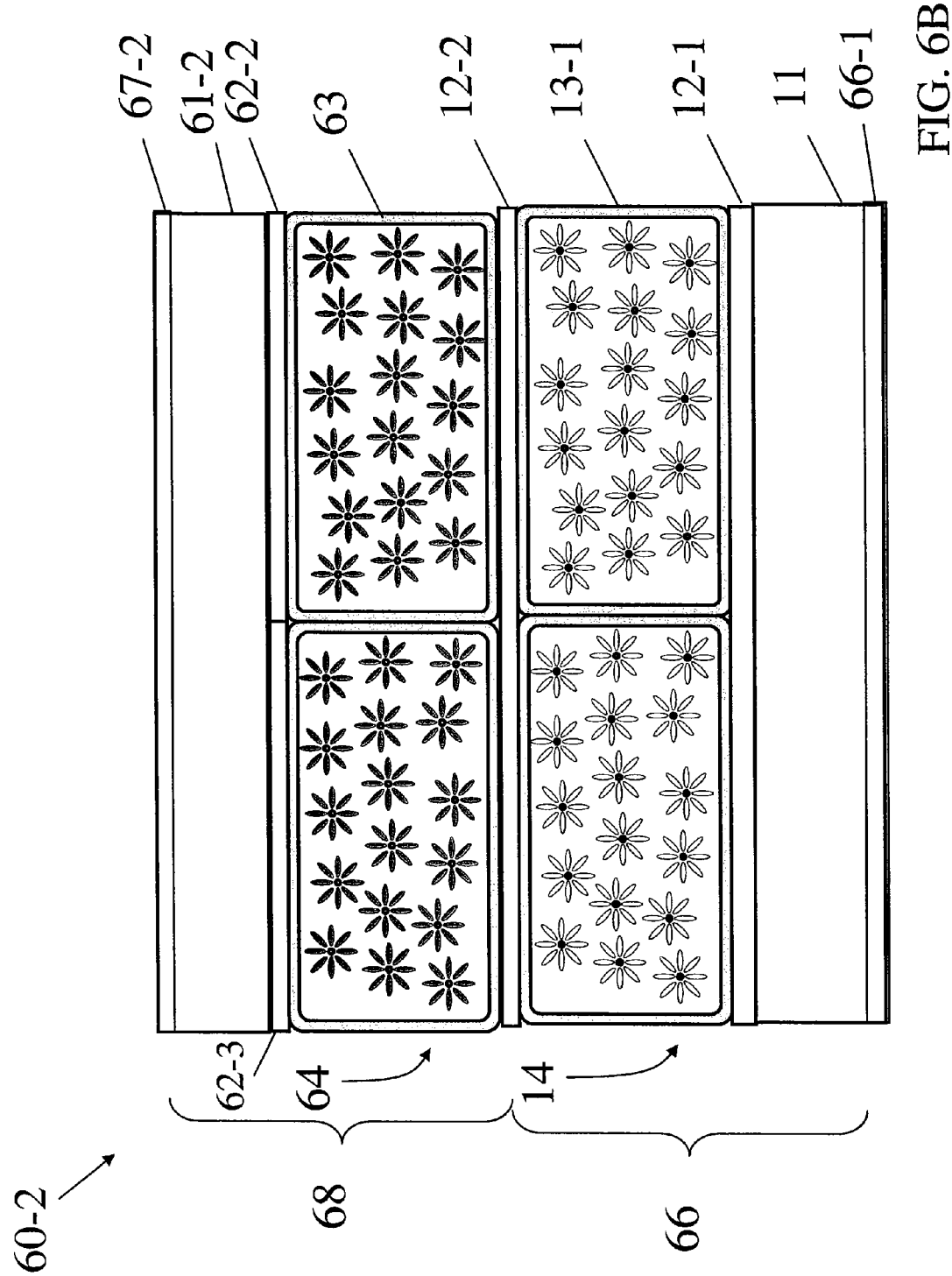
FIG. 6B is a cross-sectional diagram of an electro-optical modulator consistent with another example of the present invention.

FIG. 6B is a cross-sectional diagram of an electro-optical modulator 60-2 consistent with another example of the present invention. Referring to FIG. 6B, the electro-optical modulator 60-2 includes a first modulator 66 and a second modulator 68. The first modulator 66 is similar to the electro-optical modulator 10-1 illustrated in FIG. 1A except a first polarizer 66-1, which is disposed to sandwich the first substrate 11 with the first electrode 12-1. The second modulator 68 includes the second electrode 12-2, the second modulating structure 63, the fourth electrode 62-2, the fifth electrode 62-3, the second liquid crystal cell 64, the second polarizer 67-2 and the third substrate 61-2.

Figure 7A:
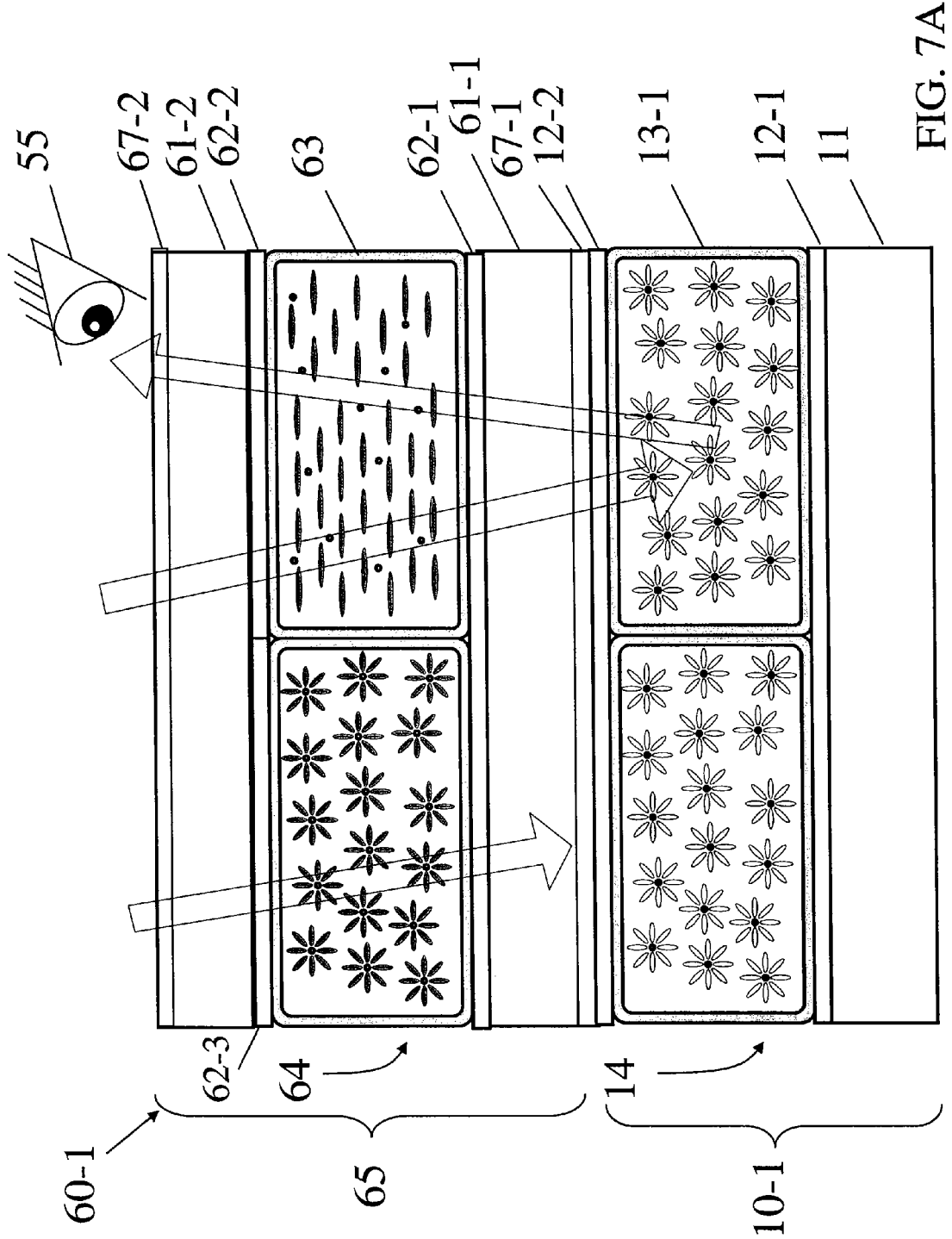
FIG. 7A is a diagram illustrating a method for operating the electro-optical modulator illustrated in FIG. 6A.

FIG. 7A is a diagram illustrating a method for operating the electro-optical modulator 60-1 illustrated in FIG. 6A. Referring to FIG. 7A, if no electrical field is applied between the third electrode 62-1 and the fifth electrode 62-3, an incident light at the third substrate 61-2 transmitting through the second polarizer 67-2 and the second liquid crystal cell 64 is blocked by the first polarizer 67-1. As a comparison, if an electrical field is applied between the third electrode 62-1 and the fourth electrode 62-2 to switch the second liquid crystal cell 64 from the isotropic mode to the anisotropic mode, an incident light at the third substrate 61-2 transmitting through the second liquid crystal cell 64 is reflected by the first liquid crystal cell 14 operating in the reflective mode. The reflected light transmits through the second liquid crystal cell 64 to the viewer 55 at the third substrate 61-2.

Figure 7B:
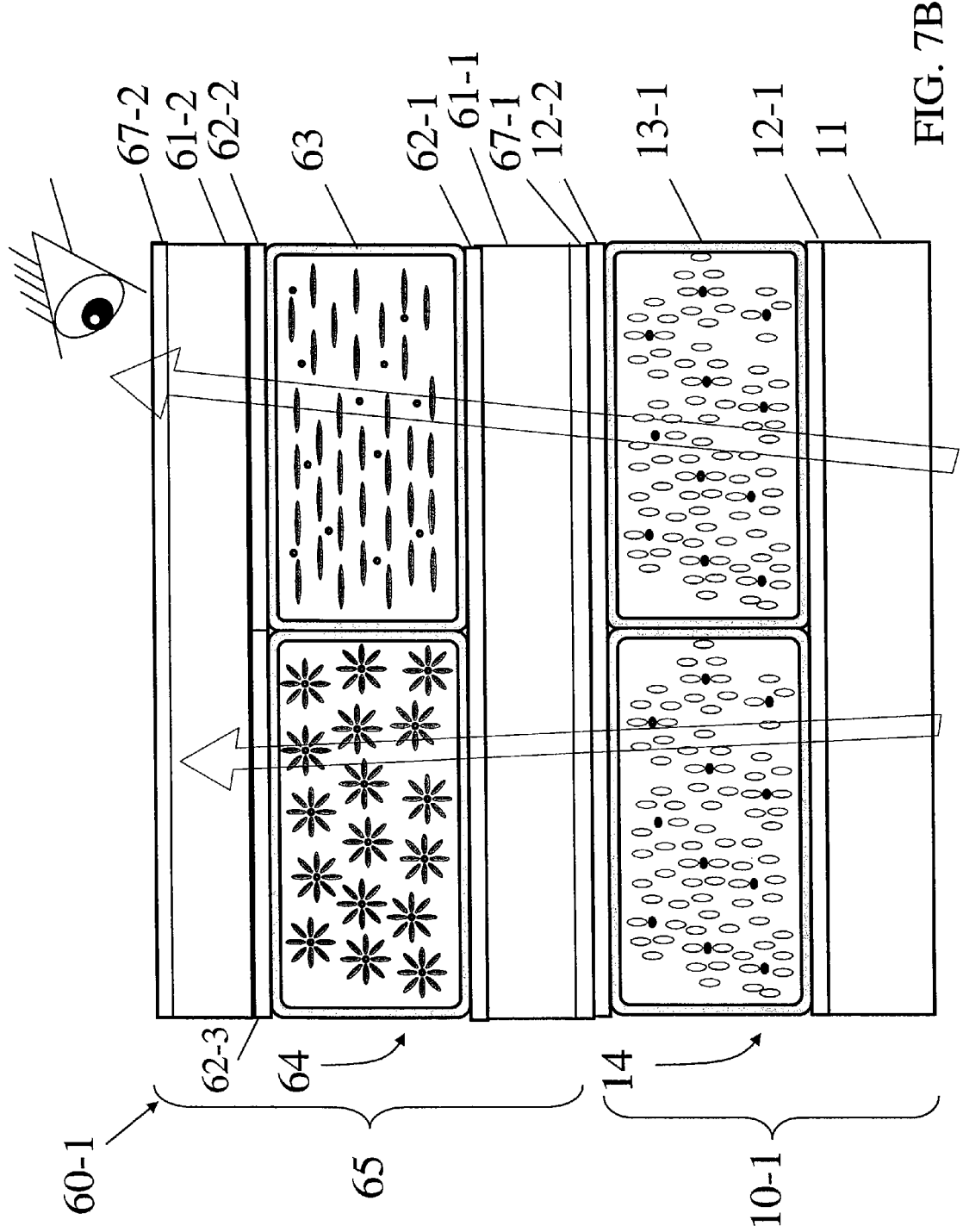
FIG. 7B is a diagram illustrating another method for operating the electro-optical modulator illustrated in FIG. 6A.

FIG. 7B is a diagram illustrating another method for operating the electro-optical modulator 60-1 illustrated in FIG. 6A. Referring to FIG. 7B, a first electrical field is applied between the first electrode 12-1 and the second electrode 12-2 to switch the first modulator 10-1 to the transmissive mode. If no electrical field is applied between the third electrode 62-1 and the fifth electrode 62-3, an incident light at the first substrate 11 transmitting through the first liquid crystal cell 14, the first polarizer 67-1 and the second liquid crystal cell 64 is blocked by the second polarizer 67-2. As a comparison, if a second electrical field is applied between the third electrode 62-1 and the fourth electrode 62-2 to switch the second liquid crystal cell 64 from the isotropic mode to the anisotropic mode, an incident light at the first substrate 11 transmitting through the first liquid cell 14 and the second liquid crystal cell 64 to the viewer 55 at the third substrate 61-2.

It will be appreciated by those skilled in the art that changes could be made to one or more of the examples described above without departing from the broad inventive concept thereof. It is understood, therefore, that this invention is not limited to the particular examples disclosed, but it is intended to cover modifications within the scope of the present invention as defined by the appended claims.

Further, in describing certain illustrative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. An electro-optical modulator, comprising:
 a substrate;
 a first electrode over the substrate;
 a second electrode over the first electrode, the first electrode and second electrode being capable of providing an electric field between the first electrode and the second electrode; and
 a modulating structure between the first electrode and the second electrode, the modulating structure containing at least one liquid crystal cell capable of operating in a selected one of a reflective mode and a transmissive mode under the control of the electrical field, wherein the liquid crystal cell includes a mixture of liquid crystal molecules, fine particles and dyes.

2. The modulator of claim 1, further comprising a layer between the liquid crystal cell and the second electrode capable of absorbing light transmitting through the liquid crystal cell.

3. The modulator of claim 1, further comprising a layer over the liquid crystal cell and the second electrode capable of absorbing light transmitting through the liquid crystal cell.

4. The modulator of claim 1, further comprising a layer between the liquid crystal cell and the second electrode capable of reflecting light transmitting through the liquid crystal cell.

5. The modulator of claim 1, further comprising a layer over the liquid crystal cell and the second electrode capable of reflecting light transmitting through the liquid crystal cell.

6. An electro-optical modulator, comprising:
a substrate;
a first electrode over the substrate;
a second electrode over the first electrode, the first electrode and second electrode being capable of providing an electric field between the first electrode and the second electrode; and
a modulating structure between the first electrode and the second electrode, the modulating structure containing at least one liquid crystal cell capable of operating in a selected one of a reflective mode and a transmissive mode under the control of the electrical field, wherein the liquid crystal cell includes a mixture of liquid crystal molecules, and fine particles, wherein the modulating structure includes a plurality of modulating units, and the liquid crystal cell includes a plurality of cell units each corresponding to one of the plurality of modulating units.

7. The modulator of claim 6, further comprising a layer between the liquid crystal cell and the second electrode capable of absorbing light transmitting through the liquid crystal cell.

8. The modulator of claim 6, further comprising a layer over the liquid crystal cell and the second electrode capable of absorbing light transmitting through the liquid crystal cell.

9. The modulator of claim 6, further comprising a layer between the liquid crystal cell and the second electrode capable of reflecting light transmitting through the liquid crystal cell.

10. The modulator of claim 6, further comprising a layer over the liquid crystal cell and the second electrode capable of reflecting light transmitting through the liquid crystal cell.

11. An electro-optical modulator, comprising:
a substrate;
a first electrode over the substrate;
a second electrode over the first electrode, the first electrode and second electrode being capable of providing an electric field between the first electrode and the second electrode; and
a modulating structure between the first electrode and the second electrode, the modulating structure containing at least one liquid crystal cell capable of operating in a selected one of a reflective mode and a transmissive mode under the control of the electrical field, wherein the liquid crystal cell includes a mixture of liquid crystal molecules, and fine particles, wherein the liquid crystal cell includes a plurality of cell units and the second electrode includes a plurality of sub-electrodes extending in parallel with each other, each of the plurality of cell units corresponding to one of the plurality of sub-electrodes of the second electrode.

12. The modulator of claim 11, further comprising a layer between the liquid crystal cell and the second electrode capable of absorbing light transmitting through the liquid crystal cell.

13. The modulator of claim 11, further comprising a layer over the liquid crystal cell and the second electrode capable of absorbing light transmitting through the liquid crystal cell.

14. The modulator of claim 11, further comprising a layer between the liquid crystal cell and the second electrode capable of reflecting light transmitting through the liquid crystal cell.

15. The modulator of claim 11, further comprising a layer over the liquid crystal cell and the second electrode capable of reflecting light transmitting through the liquid crystal cell.

16. An electro-optical modulator, comprising:
a substrate;
a first electrode over the substrate;
a second electrode over the first electrode, the first electrode and second electrode being capable of providing an electric field between the first electrode and the second electrode;
a modulating structure between the first electrode and the second electrode, the modulating structure containing at least one liquid crystal cell capable of operating in a selected one of a reflective mode and a transmissive mode under the control of the electrical field, wherein the liquid crystal cell includes a mixture of liquid crystal molecules, and fine particles; and
a layer between the liquid crystal cell and the second electrode, the layer being capable of:
absorbing light transmitting through the liquid crystal cell,
or
reflecting light transmitting through the liquid crystal cell.

17. The modulator of claim 16, wherein the modulating structure includes a plurality of modulating units, and the liquid crystal cell includes a plurality of cell units each corresponding to one of the plurality of modulating units.

18. The modulator of claim 16, wherein the liquid crystal cell includes a plurality of cell units and the second electrode includes a plurality of sub-electrodes extending in parallel with each other, each of the plurality of cell units corresponding to one of the plurality of sub-electrodes of the second electrode.

* * * * *

UNITED STATES PATENT AND TRADEMARK OFFICE
CERTIFICATE OF CORRECTION

PATENT NO. : 7,605,967 B2  Page 1 of 1
APPLICATION NO. : 11/462079
DATED : October 20, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 180 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,605,967 B2 | Page 1 of 1 |
| APPLICATION NO. | : 11/462079 | |
| DATED | : October 20, 2009 | |
| INVENTOR(S) | : Wang et al. | |

It is certified that error appears in the above-identified patent and that said Letters Patent is hereby corrected as shown below:

Column 1,

Line 12, "c-signature." should read --e-signature,--.

Signed and Sealed this

Sixteenth Day of November, 2010

David J. Kappos
*Director of the United States Patent and Trademark Office*